United States Patent [19]
Armerding et al.

[11] Patent Number: 5,555,374
[45] Date of Patent: Sep. 10, 1996

[54] SYSTEM AND METHOD FOR COUPLING A PLURALITY OF PERIPHERAL DEVICES TO A HOST COMPUTER THROUGH A HOST COMPUTER PARALLEL PORT

[75] Inventors: Donald G. Armerding, San Diego; William B. Beal, Solana Beach; Alan J. Izzo; Billy A. Oostra, both of San Diego; Terrell L. Rodman, Carlsbad, all of Calif.

[73] Assignee: Systech Computer Corporation, San Diego, Calif.

[21] Appl. No.: 296,713

[22] Filed: Aug. 26, 1994

[51] Int. Cl.$^6$ .......................... G06F 13/38; G06F 15/16; G06F 15/173

[52] U.S. Cl. ............. 395/200.02; 395/835; 364/DIG. 1; 364/DIG. 2

[58] Field of Search ................ 395/200.84, 325, 395/115, 800, 114, 275, 154, 725, 250, 500, 575, 162, 200.04, 182.03, 182.12; 364/DIG. 1, DIG. 2, 132, 133, 138; 340/825.02, 825.03, 825.06, 825.15, 825.08; 371/11.1–13; 358/518

[56] References Cited

U.S. PATENT DOCUMENTS

| | | | |
|---|---|---|---|
| 4,419,736 | 12/1983 | Christenson et al. | 395/275 |
| 4,706,080 | 11/1987 | Sincoskie | 340/825.02 |
| 4,896,289 | 1/1990 | Svnicki et al. | 395/575 |
| 4,941,089 | 7/1990 | Fischer | 395/325 |
| 5,109,329 | 4/1992 | Strelioff | 395/725 |
| 5,142,614 | 8/1992 | Schneider et al. | 395/115 |
| 5,299,314 | 3/1994 | Gates | 395/275 |
| 5,408,342 | 4/1995 | Kumada et al. | 358/518 |
| 5,408,614 | 4/1995 | Thornton et al. | 395/275 |

*Primary Examiner*—Daniel H. Pan
*Attorney, Agent, or Firm*—Baker, Maxham, Jester & Meador

[57] ABSTRACT

A host computer is coupled to a plurality of peripheral devices through a single parallel port in the host computer. A terminal adapter connected to the host computer parallel port includes a plurality of ports for connection to the plurality of peripheral devices. A host interface memory in the host computer receives control structures containing control and status information and data for peripheral device operation from device drivers in the host computer. The host interface memory buffers the control structures and a port interface operating through the host and terminal adapter parallel ports transports the control structures from the host computer to the terminal adapter. In the terminal adapter, a terminal adapter interface memory holds a mirror image of the contents of the host memory and the terminal interface accesses the terminal adapter interface memory to obtain control data structures which are used to operate the peripheral devices.

7 Claims, 12 Drawing Sheets

SYSTEM AND METHOD FOR COUPLING A PLURALITY OF PERIPHERAL DEVICES TO A HOST COMPUTER THROUGH A HOST COMPUTER PARALLEL PORT

BACKGROUND OF THE INVENTION

The invention concerns the connection of a host computer with a plurality of peripheral devices, and more particularly is directed to connection of the plurality of peripheral devices to the host computer through a port in the host computer.

The connection of peripheral devices to a host computer presents a significant engineering challenge that is compounded as the demand for peripheral device connection grows, while the physical resources necessary to support plural connection to a host computer shrink. Typically, the connection between a host computer and a peripheral device is through a single entity referred to as a port. When used herein, the word "port" implies both the electro-mechanical interface (connector) and associated electronics (logic) that support the transport of information and data between a host computer and a peripheral device.

It is known to connect a plurality of peripheral devices through a single host computer port. See, for example, the communications subsystem described in U.S. Pat. No. 4,845,609, commonly assigned with this patent application and incorporated herein by reference. The communications subsystem is illustrated in FIG. 1.

In FIG. 1, a host computer 10 is connected to a plurality of peripheral devices including peripheral devices 12 and 14 by way of cluster controllers 16 and 17, respectively. The host computer 10 is connected to the cluster controllers 16, 17 by way of a token-passing local area network (LAN) 18 that connects to the host computer 10 through a single LAN port 20. Each of the cluster controllers 16, 17 includes a plurality of serial ports, such as the serial ports 21 on the cluster controller 16.

More specifically, as FIG. 1 illustrates, the host computer 10 includes a plurality of drivers 24, each of which comprises operating system logic for controlling peripheral devices. In this regard, each of the drivers 24 is provided as an operating system routine in the host computer 10 that embodies logic necessary to operate a specific peripheral device. The device drivers 24 are coupled by a driver interface 26 with a host adapter 27 with logic including a host interface handler 28, terminal control tasks 29, and a network manager 30. The host adapter 27 also includes a dual port random access memory (DPRAM) structure 31 for buffering control and status information and data between the device drivers 24 and the peripheral devices 12. The components of the host adapter 27 are coupled by a bus 32 that reflects the specific architecture and functionality of the underlying processor platform. In this regard, the operations of the host interface components 28–31, are taxed by the overhead necessary to conduct operations on the bus 32.

Thus, while the communications subsystem operates with extraordinary effect to couple a plurality of peripheral devices to the host computer 10 through the single LAN port 20, it does require adaptation to the bus architecture of the particular host computer platform on which it is installed.

Further, as is known, the number of card slots for the host computer bus is limited. When all of the modules necessary to host computer operation occupy card slots, the slots remaining are in very short supply. Thus, if the modularized host adapter can be moved outside of the host computer, a scarce data bus slot would be freed.

Last, the prior art communication subsystem is complex and relatively expensive. When used to fan out a single host computer port to many (over 32) peripheral device ports, the subsystem is cost effective. However, for fewer ports, (4–32), the subsystem may not be cost effective.

Accordingly, it should be evident that there is a need to reduce the data bus dependency of a communications subsystem that couples a host computer to a plurality of peripheral devices through a single host computer port, while making the subsystem cost effective for a limited number of ports.

SUMMARY OF THE INVENTION

The present invention reduces the platform dependence and slot occupancy of the prior art communications subsystem by moving certain components of the host interface out of the host computer to a remote terminal adapter and by providing communications between a plurality of peripheral devices and their associated host computer drivers by means of a standard control mechanization in the form of a bi-directional communications protocol through a single parallel port to which the terminal adapter is connected.

This solution requires replication of the DPRAM contents in the remote terminal adapter in order to maintain the existing status and control and data interfaces between the host computer drivers and the terminal control tasks that implement interfaces between the drivers and the peripheral devices.

DETAILED DESCRIPTION OF THE PREFERRED EMBODIMENT

Figure 1:
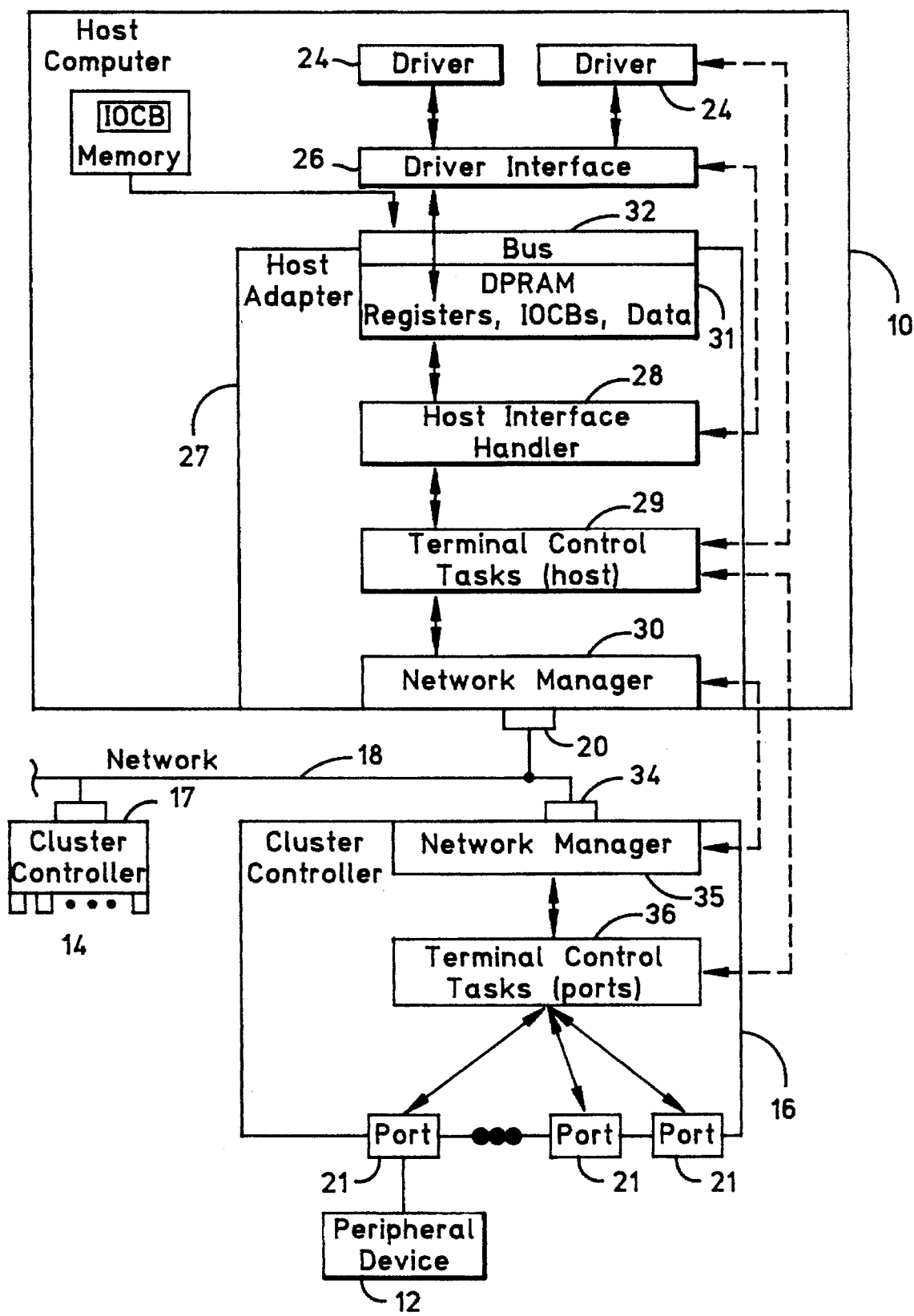
FIG. 1 and FIG. 2 illustrate prior art subsystems for communicating between peripheral devices and host computer device drivers.

Continuing with the description of the prior art communications subsystem in FIG. 1, control and status information and data exchanged between the device drivers 24 and the peripheral devices 12 is carried in a data structure called an input/output control block (IOCB). IOCBs and associated data get to and from the host adapter 27 in two ways. First, they may be assembled in a host computer memory 35 by host computer logic and placed in DPRAM 31 by that logic. Alternatively, they can be copied from the host memory to DPRAM by the host interface handler 28.

The DPRAM is layed out according to a memory map that includes addressable storage space for staging IOCBs and associated data. The DPRAM also implements a set of control registers for intertask communication.

The driver interface 26 executes an interrupt-driven protocol with the host adapter 27 through the host interface handler 28. A command for a peripheral device from a device driver is placed in an IOCB and an interrupt is passed to the host interface handler 28 through the DPRAM registers, notifying it that an IOCB is available for processing. The host interface handler 28 notifies the terminal control tasks 29 that an IOCB is in the DPRAM 31. The control tasks 29 are logically broken into two components: host process support (HPSX) logic and terminal control software (TCS). In addition to low-level support including multi-tasking and timer facilities, the HPSX component of the terminal control tasks 29 routes IOCBs to and from the TCS by way of a host request task and a host response task. The TCS includes a plurality of tasks that process the IOCBs and data. In the '609 architecture illustrated in FIG. 1, the TCS is divided between the host adapter 27 and cluster controllers, including the cluster controller 16. The host adapter portion of the TCS, part of the terminal control tasks 29, manages the flow of IOCBs and data, manages multi-channel reads and writes, and manages the network. The cluster controller portion of the terminal control tasks 36 manages the peripheral ports 21 by setting baud rates, implementing data flow control, buffering, and processing transmission errors.

Figure 2:
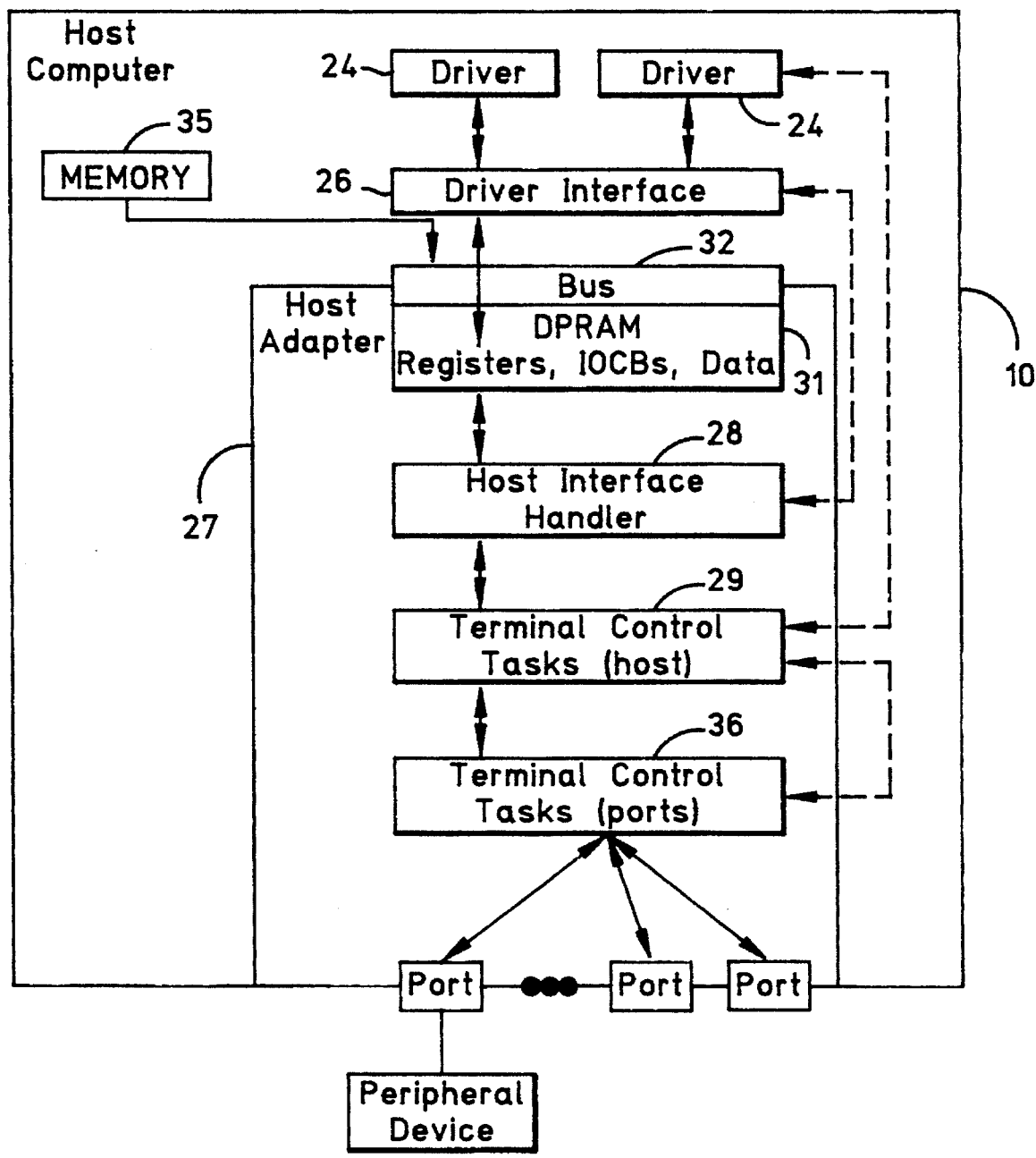

FIG. 2 shows an alternative prior art embodiment in which all of the terminal control tasks 29, 36 reside in the host computer 10. In this architecture, the TCS is still divided into portions 29 and 36. The host adapter portion 29 still manages the flow of IOCBs and data, as well as multi-channel reads and writes. The "ports" portion 36 of the terminal control tasks still manages the peripheral ports.

The two embodiments of the host adapter 27 in FIGS. 1 and 2 include groups of tasks that respectively run on the host computer 10 and occupy a module slot of the host computer. In each case, the DPRAM 31 physically and logically resides on the host adapter 27 and is accessible from the host computer 10 through the bus 32.

The terminal control tasks 29, 36 and the network manager 30, 34 of FIG. 1 are independent of the host interface handler 28. Likewise, in FIG. 2, the terminal control tasks 29, 36 are independent of the host interface handler 28. Similarly, on the host computer 10, the driver interface task 26 is independent of the terminal control tasks 29, 36 and deals only with the host interface handler 28 and its associated DPRAM 31.

The dotted lines in FIG. 1 and 2 point to related layers that logically communicate independently of other layers, except for defined interfaces. The related layers may or may not be separated by a physical layer. For example, in FIG. 1, the related driver interface 26 and host interface handler 28 are separated by physical interface comprising the bus 32. Similarly, the terminal control tasks 29 and related terminal control tasks 36 are separated by a network manager layer in a physical network 18.

THE INVENTION

Figure 3:
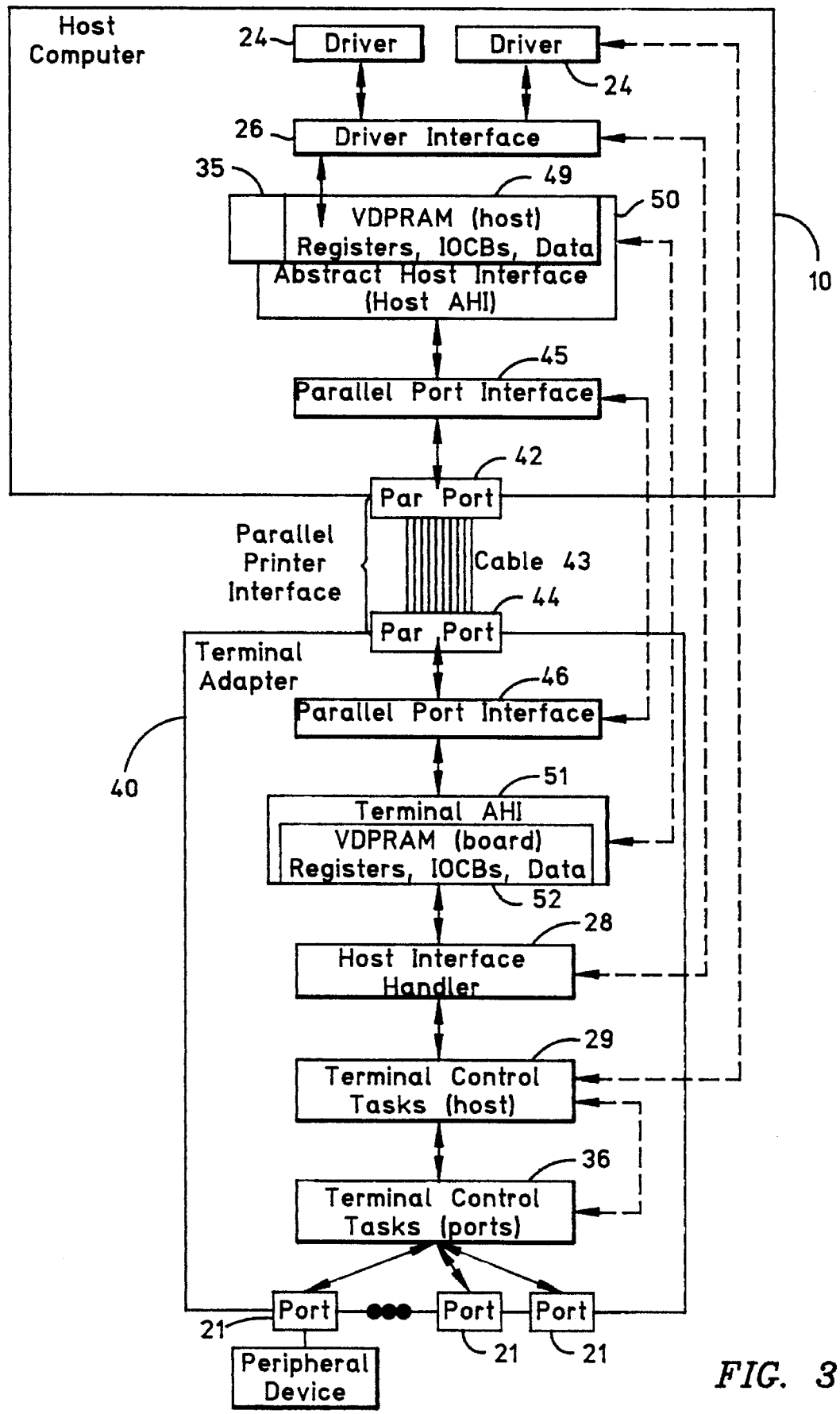
FIG. 3 is a block diagram of the present invention showing the principal components of an interface between a plurality of peripheral devices and their associated device drivers in a host computer through a single parallel printer interface.

The invention is illustrated in its essential aspect in FIG. 3. The invention provides the host computer 10 with access to a plurality of peripheral devices such as peripheral device 12 through a single host computer port. In FIG. 3, the host computer port is the parallel printer port accessed through a multi-pin connector 42 that supports the wellknown parallel interface embodied in the IEEE P1284 standard. Typically, the standard parallel interface is employed to operate a port as a parallel printer port. The parallel printer interface includes a multi-conductor cable 43 which connects to the connector 42 and to a peripheral device having a complementary multi-pin connector. In this case, the multi-pin connector 44 is on a terminal adapter 40 that is separate and remote from the host computer 10. The terminal adapter 40 includes the plurality of serial ports 21 that connect to peripheral devices such as the peripheral device 12. The terminal adapter 40 also includes a multi-pin connector 60 that implements a port for connection to a parallel printer and therefore provides the intended function of the connector 42 on the host computer 10.

In the host computer, the device drivers 24 observe the driver interface 26 discussed above and described in the incorporated '609 patent. Further, the control and status information and data that is transferred across the interface between the device drivers and the host interface of the prior art communications subsystem is provided for the operation of this invention in the prior art data structures including IOCBs, associated data, and control registers in a virtual DPRAM (VDPRAM) 49 that occupies addressable space in the host computer memory 35.

The invention provides an abstract host interface (AHI) having host and terminal adapter components 50 and 51. The host AHI 50 is embodied as logic that is implemented in task software compiled and executed in the host computer 10. The architecture of the host computer 10 corresponds essentially with the architecture of the host computer in the '609 patent. The hardware architecture of the terminal adapter 40 corresponds essentially to that of the host adapter and cluster controllers described in the incorporated '609 patent. Therefore, it includes the processor capacity necessary to execute software embodying the terminal AHI logic 51. The abstract host interface components 50 and 51 are, respectively, coupled to parallel port interfaces 45 and 46 which implement the IEEE P1284 interface between the host computer 10 and the terminal adapter 40 through the physical signal transmission path 42, 43, 44. As is known, the IEEE P1284 standard describes a protocol for bi-directional transfer of data on a byte-wide basis across a communications pathway having two end points. In the architecture of FIG. 3, the end points are host computer 10 and the terminal adapter 40. The parallel port interfaces are software tasks executed in their respective locations.

The invention illustrated in FIG. 3 locates all of the terminal control tasks 29, 36 including HPSX and TCS entirely in the terminal adapter 40. In the invention, the functional and physical interface to the terminal control tasks 29, 36 is through the parallel printer interface 45, 42, 43, 44, 46. The terminal control tasks operate in response to a copy of the VDPRAM 49 that is maintained in the terminal adapter 40 as a virtual DPRAM (VDPRAM) 52. The task of the abstract host interface 50, 51 is two-fold: operation of the parallel interface and maintenance of the VDPRAM 52. From the point of view of the terminal control tasks 29, 36, the parallel interface is indistinguishable from the bus interface of FIGS. 1 and 2. However, the invention eliminates the bus interface dependency, at least in the host computer 10, permitting the driver interface and the abstract host interface to deal with a standardized communications protocol in the form of a parallel port that conforms to the IEEE P1284 standard (for example), while preserving the functional interface to the peripheral devices 12. Moreover, the invention provides a means for multiplexing a plurality of device driver/peripheral device interfaces through a single host computer parallel port, thereby multiplying the number of peripheral devices to which the host computer 10 can connect, without increasing its physical connector interface.

In the discussion which follows, it is asserted that the interface between the HPSX and TCS components of the terminal control tasks 29 and 36 and the physical and functional connections between the TCS and the ports in the terminal adapter 40 are essentially as described in the incorporated '609 patent.

Further, the interface between the AHI elements 50 and 51 is a hardware interface, implemented by the parallel port interfaces 45 and 46, respectively. The hardware interface is well-defined and is manipulated by the parallel port interfaces 45 and 46 in order to send and to receive AHI protocol messages. The interface for 45 through 46 is implemented as defined in the IEEE document entitled *Standard Signalling Method for a Bi-directional Parallel Peripheral Interface for Personal Computers*, Mar. 15, 1993, IEEE P1284 D100.

The AHI interface to the terminal control tasks 29, 36 is through the VDPRAM 52. The base application code which serves as a reference for the AHI layer interface is embodied in the Host Adapter software of the HPS-6800 and HPS-6200 series of products available from the assignee. As with the HPS software, the AHI operation and function is based on IOCBs residing in the DPRAM 31. The operation and function of the AHI layer (50, 51) minimizes the amount of code change in the terminal control tasks 29, 36, while not adversely affecting performance. In addition, the AHI layer provides the image of the VDPRAM 49 in the form of the VDPRAM 52, which looks the same as if it were DPRAM 31 shared on a bus as in the prior art communications subsystem. The images of the VDPRAM maintained in the host computer 10 and the terminal adapter 40 are identical. Whenever an IOCB is sent across the AHI interface, it is referenced by an offset into the VDPRAM 52. As the AHI layer transports an IOCB from the host computer 10 to the terminal adapter 40, it places the IOCB and associated data into the proper place in the VDPRAM 52 and then notifies the terminal control tasks 29, 36 that a new IOCB has arrived, just as if it had arrived over the bus interface of the prior art. When the terminal control tasks 29, 36 need to notify the driver interface 26 of the completion of an IOCB-initiated task, they send an "IOCB complete" message to the host computer 10, placing the message data in the VDPRAM 52 as if it were DPRAM 31 connected by bus as in the prior art. Then the terminal control tasks 29, 36 notify the AHI layer to transfer the message to the host. Thus, the VDPRAM 52 provides an application interface which the terminal control tasks 29, 36 currently use and minimizes the need for intermediary buffers by providing a place for data transfer.

The prior art HPS-6200 series Host Adapter logic includes HPSX and TCS components of the terminal control tasks 29, 36. The HPSX includes a host request task and a host response task (hst_req_task and hst_rsp_task, respectively), that provide the TCS with an interface to host functions. The hst_req_task passes IOCBs received from the host to the appropriate TCS task. The hst_rsp_task handles interrupting the host functions, allowing the TCS tasks to communicate with the host.

Figure 4:
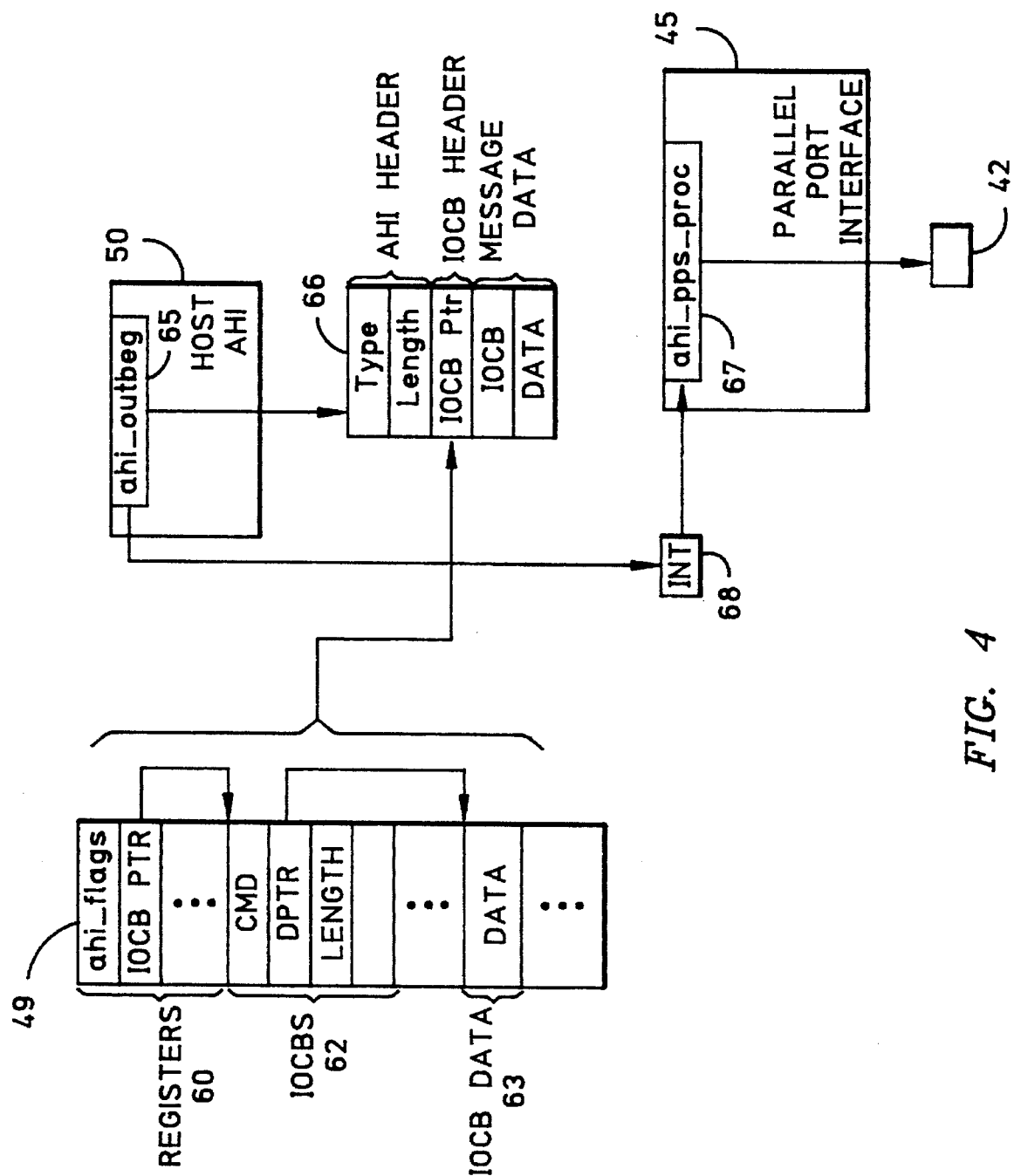
FIG. 4 is a combination block and data flow diagram showing movement of information from the host computer over the parallel printer interface of FIG. 3.
Figure 5:
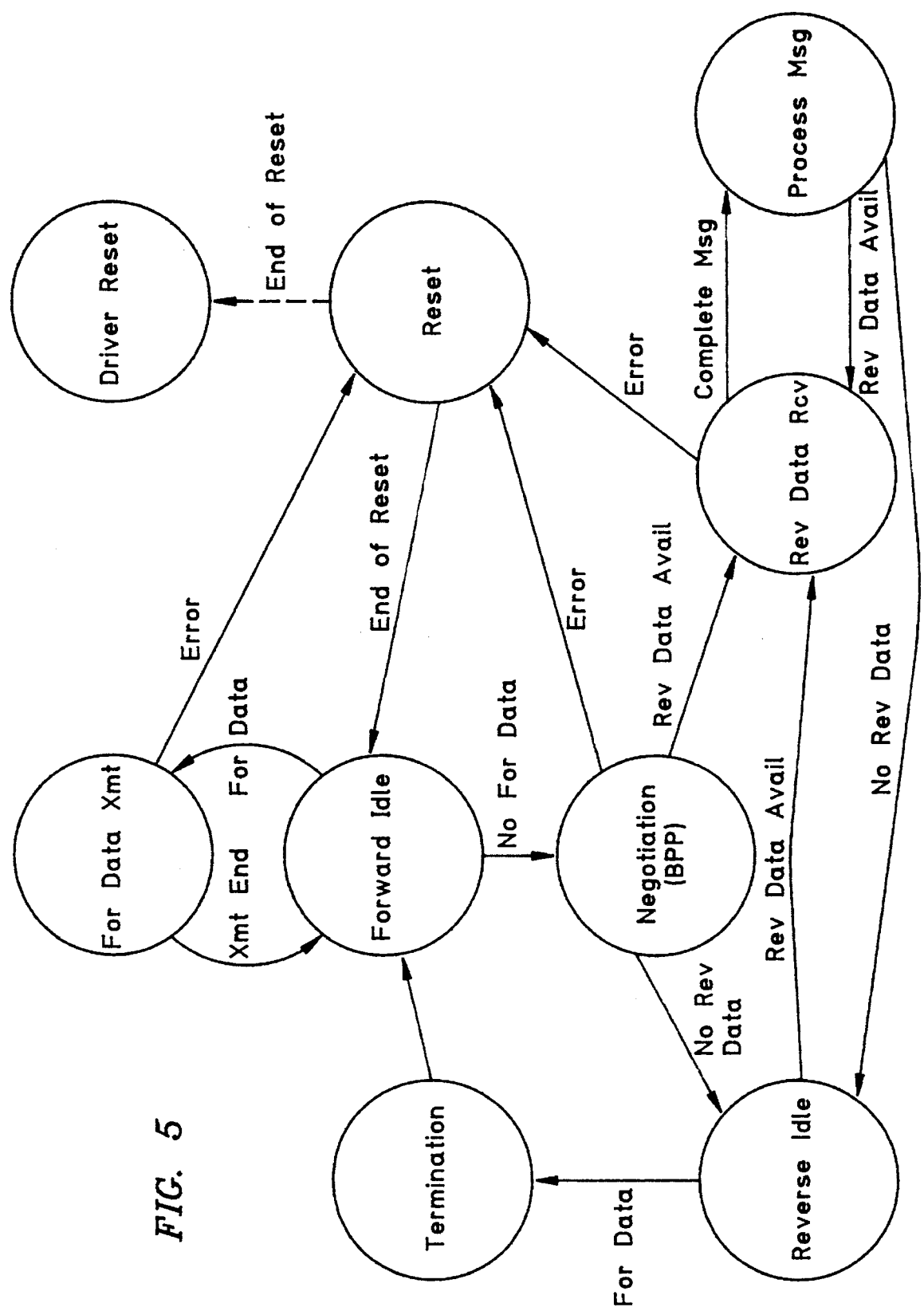
FIG. 5 is a state transition diagram illustrating state transitions for the bi-directional parallel port (BPP) mode of the IEEE p1284 standard.

Refer to FIGS. 4 and 5 now for an understanding of the host AHI 50 and the parallel port interface 45. The host AHI 50 drives the host parallel port connected to the terminal adapter 40. The interface between the host AHI 50 and the driver interface 26 is in the VDPRAM 49 which is partitioned into pseudo register, IOCB, and IOCB data sections 60, 62 and 63, respectively. The pseudo registers 60 include fields that contain interrupt and busy flags that are used by the host AHI 50, the driver interface 26, and the HPSX 29 for inter-process communication. The driver interface 26 provides only one IOCB at a time, queuing any others until the current one has been processed. When it hands an IOCB to the host AHI 50, the driver interface 26 prepares other functions, or idles, until the HPSX provides notification of completion. Then, the driver interface 26 is interrupted to complete any processing still remaining for the IOCB.

The driver interface 26 moves the IOCB and IOCB data into the VDPRAM 49, where the host AHI 50 will look for these data structures at a VDPRAM offset entered by the driver interface into the IOCB PTR field. As shown in FIG. 4, the IOCB PTR ultimately will be set to point to an IOCB in the IOCB section 62. Further, any data accompanying an IOCB is pointed to by a DPTR field in the IOCB. In the prior art, the host interface handler would interrupt the HPSX component of the terminal control tasks, which would obtain the IOCB and IOCB data by inspecting the IOCB PTR field as a register 60. In the invention, however, the host AHI includes a task ahi_outbeg 65 that assembles an AHI message in an AHI message buffer 66. The AHI message, which is to be sent to the terminal adapter 40, has the format shown in FIG. 4 and includes a header with type and length fields. The type field indicates the type of message which is to be sent across the parallel printer interface, while the length field specifies the total length of the message, including the length of the header plus the number of bytes in the IOCB and data fields.

Two of the VDPRAM fields are essential to the routing or content of an IOCB, all of the remaining information that is necessary for TCS processing being contained within an IOCB. The IOCB PTR and DPTR fields are used identically in the VDPRAM 49 and the DPRAM 52. In this regard, all references to an IOCB and accompanying data are through a unique offset in the IOCB PTR from a predetermined VDPRAM base. The IOCB PTR value is returned to the host computer when IOCB processing is complete and constitutes the final handshake to signify completion of IOCB processing in the terminal adapter.

Once the ahi_outbeg task 65 processes an IOCB and accompanying data into an AHI message and places it in an AHI message buffer 66, it starts output of the AHI buffer 66 on the parallel port 42 by calling an interrupt-driven task ahi_pps_proc 67 n the parallel port interface 45. The ahi_pps_proc function 67 services a parallel port interrupt 68, obtains the AHI message buffer 66 and implements the IEEE P1284 state transitions that are necessary to transfer the AHI message through the parallel printer interface to the parallel port interface 46 in the terminal adapter 40.

FIG. 5 is a state flow diagram that illustrates the IEEE P1284 operational states for the BPP mode of operation. The states are implemented by ahi_pps_proc 67. The state flow begins in a Reset state during initialization and transitions to a Forward Idle state, where the ahi_pps_proc 67 checks the interrupt 68 set by ahi_outbeg 65 when there is an AHI message to transmit. If there is an IOCB to send to the terminal adapter 40, the transition is made to a Forward Data Transmit (FOR DATA XMT) state in which initial handshaking is initiated with the parallel port interface 46 in the terminal adapter 40, the AHI message is sent, and the final handshake is exchanged. Following the final handshake, the Forward Idle state is again entered. If there is no forward data to transmit, a Negotiation state is entered whereby the parallel port interfaces 45 and 46 negotiate to a Reverse Idle state. The Reverse Idle state is essentially the "rest" state for both of the parallel port interfaces 45 and 46. The parallel port interface 45 will exit the Reverse Idle state when the interrupt 68 is again set, or when an initial handshake for data transfer to the host computer 10 is offered by the parallel port interface 46 in the terminal adapter 40. For transmission of forward data upon the setting of the interrupt 68, the ahi_pps_proc 67 transitions through a Termination state, the Forward Idle state, and into the Forward Data Transmit state as explained above. In the event of an initial handshake from the parallel port interface 46 indicating reverse data is available for transmission through the parallel printer interface from the terminal adapter to the host computer 10 the ahi_pps_proc 67 transitions to a Reverse Data Receive (Rev Data Rcv) state, receives an AHI message, processes the message (Process Msg) and returns to the Reverse Idle state. Error transitions to the Reset state are provided from the Reverse Data Receive, Negotiation, and Forward Data Transmit states.

Figure 6:
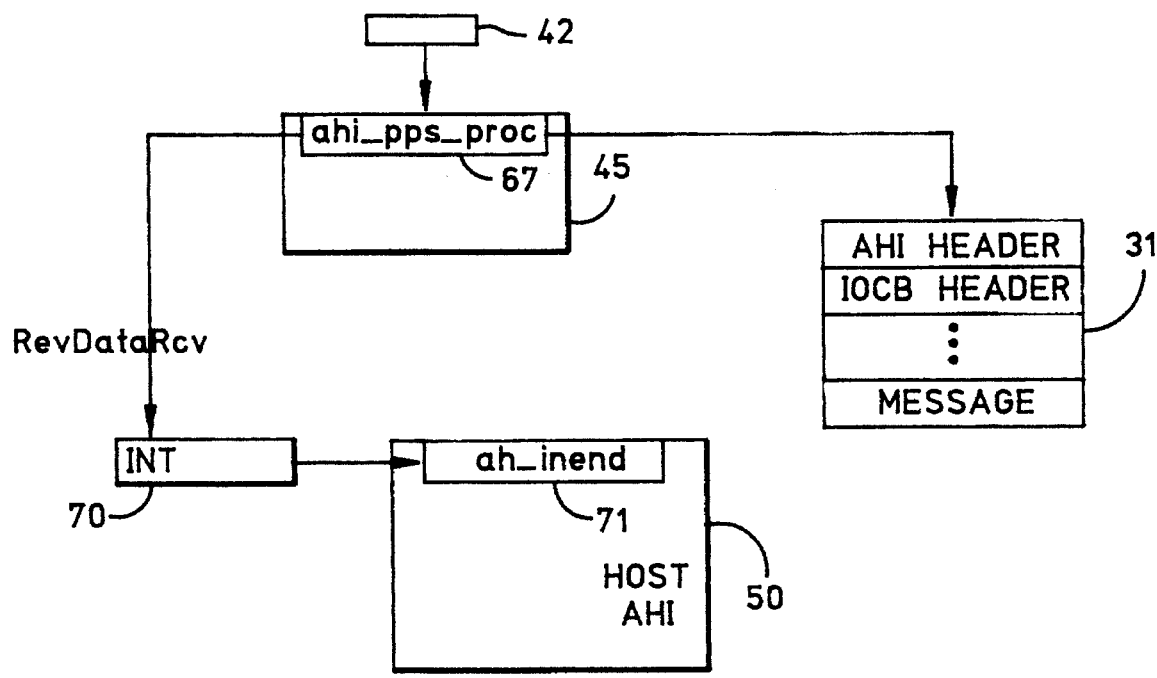
FIG. 6 is a combination block and data flow diagram showing movement of information into the host computer over the parallel printer interface of FIG. 3.

AHI inbound processing at the host computer 10 is illustrated in FIG. 6; it begins when the ahi_pps_proc 67 transitions to the Reverse Data Receive (Rev Data Rcv) state, at which time it sets an interrupt 70 that drives an AHI input processing function ahi_inend 71. When the last byte of an AHI message indicating completion of a command contained in an IOCB is received, the returned AHI message contains host code and HPSX completion message is placed in respective host code and Message fields of the DPRAM registers 60. The contents of the host code and Message fields are placed in the IOCB by the host computer task which originates the IOCB. These fields circulate to the Terminal control tasks and are returned when IOCB processing is completed so that the host computer task can evaluate the outcome of the processing. When the Message field is filled with the inbound message, the ahi_inend 71 invokes a response process in the driver interface 26.

Turning now to the operation of the invention in the terminal adapter 40, the parallel port interface 46 and terminal AHI 51 provide the terminal control tasks 29, 36 with a parallel port interface that is indistinguishable from the bus interface that the HPSX expects. The parallel port interface through the connector 44 is a hardware interface for the terminal adaptor 40 and, as such, is manipulated by the parallel port interface 46 in the manner described above with respect to the parallel port interface 45 to receive and send AHI protocol messages. The BPP mode explained above in respect of FIG. 5 is implemented by the parallel port interface 46. The AHI protocol messages are manipulated by the terminal AHI 51 to implement the interface with the terminal control tasks 29, 36 by way of the VDPRAM 52.

As explained above, when host computer tasks need to send an IOCB to the terminal control tasks 29, 36, an IOCB is generated in VDPRAM, along with any data desired to be sent with the IOCB. If the IOCB has data associated with it, the offset to the data, in bytes, from the beginning of VDPRAM to the first byte of data is in the DPTR field of the IOCB. The length of the associated data is also placed in the LENGTH field of the IOCB. In addition to these fields, the AHI layer also initializes other IOCB fields as required by the type IOCB being sent. After initializing the IOCB, the offset to the IOCB in the beginning of DPRAM is placed in the IOCB PTR field of the VDPRAM pseudo registers.

In the prior art of the '609 patent and the HPS-6200 products, the task which handles an interrupt generated by a host task is host_request_isr. This task performs two functions: manipulation of an interrupt flag in the DPRAM registers and posting of the IOCB PTR field to a host_req_task in the HPSX. Upon receiving the offset to the IOCB, the host_req_task calculates the address of the IOCB, validates the size of the IOCB, and determines what TCS task is to receive this IOCB. Assuming a valid TCS task to receive the IOCB, the host_req_task posts the address of the IOCB to that task's input queue. After posting the IOCB to the TCS task, the host_req_task clears an HPS flag in the VDPRAM pseudo registers, indicating that another IOCB may be sent. If the IOCB is in error in any way, the host_req_task generates a specific interrupt back to a host task indicating why the IOCB cannot be processed.

It is important to note that the prior art communication subsystem of the '609 patent and the HPS-6200 products also employ the IOCB protocol to implement multi-channel read and write requests from host tasks. Such requests are transferred via the IOCB protocol to the appropriate TCS task in the same manner as described above. However, additional fields in the DPRAM registers are used to regulate inter-task data transfer in order to avoid buffer underflow and overflow.

In this regard, a "multi-channel read" indicates, in a single multichannel read IOCB, which peripheral devices are to provide data to host computer tasks. A "multi channel write" provides data for a plurality of peripheral devices by way of a single multi-channel write IOCB. For a complete explanation of these operations, see the HPS Terminal Control Software User Manual, Document No. 80-000634-1-00 (1993) and the HPS 6200 Series Application Installation User Manual, Document No. 80-000849-9-00, both published by the assignee of this application, and both publicly available.

In the prior art, when a terminal control task has completed an action requested by a host computer task, it issues an IOCB complete message. There is always a one-for-one relationship between IOCB deliveries by the host computer and IOCB completions by the terminal control tasks. The HPSX component communicates IOCB completions to the host. In order to communicate an IOCB completion, an HPSX function takes the address of the IOCB to be completed and the status of the IOCB completion. The HPSX function formats a message control block (MCB) that is passed to another HPSX task (hst_rsp_task). The MCB gives the hst_rsp_task all the information it needs to fill in certain the Host Code Message fields of DPRAM pseudo registers. When the hst_rsp_task receives the MCB, it sets the fields of the VDPRAM pseudo registers as defined by the MCB. When these fields are filled, the hst_rsp_task sets an interrupt flag in the DPRAM registers, if necessary. The hst_rsp_task then frees the MCB, logs the transaction, and performs any waiting work.

Returning to the description of the invention, and with reference to FIG. 3, it will be appreciated that the AHI layer including the host AHI 50 and terminal AHI 51, provides the terminal control tasks 29, 36 with a transparent interface to the parallel printer interface combination including 45, 42, 43, 44, and 46.

Figure 7:
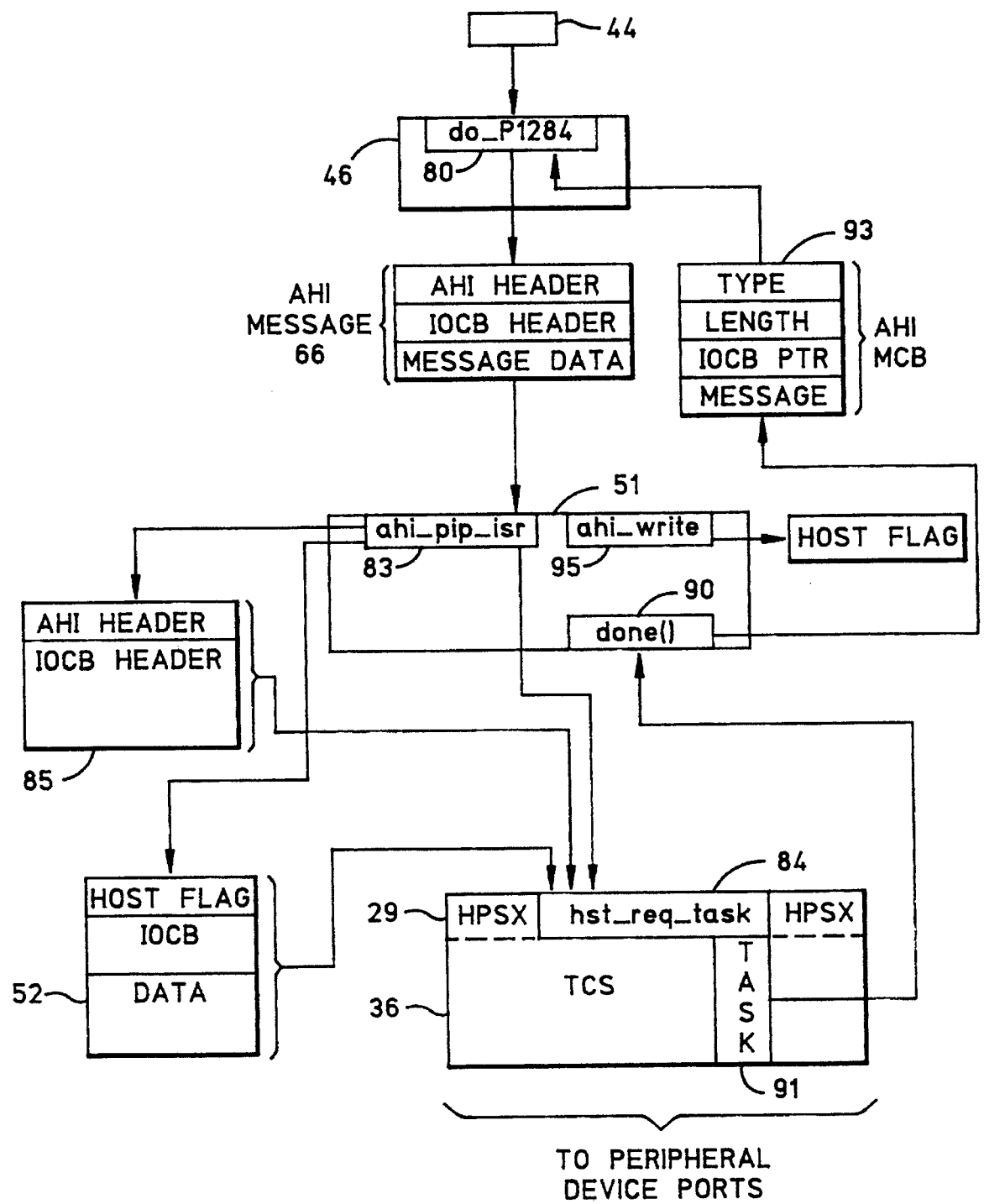
FIG. 7 is a combination data flow and block diagram illustrating the movement of information into and out of the terminal adapter through the parallel printer interface of FIG. 3.

FIG. 7 illustrates the structure and interrelationship of tasks of the terminal adapter 40. In this regard, the parallel port interface 46 includes a task do_p1284 (indicated by reference numeral 80) which implements IEEE p1284 compatibility, and does negotiation for the BPP mode illustrated in FIG. 5. The do_p1284 task 80 includes a state machine that operates according to FIG. 5 for transmission and reception of data through the parallel printer interface. The do_p1284 function can be called from the terminal AHI 51 to implement state transitions or can respond to transition of one of the control signal paths in the parallel port interface for the purpose of transferring data from a host computer 10 to the terminal adapter 40 or from the terminal adapter 40 to the host computer 10. The events which drive the do_p1284 task 80 are described in detail in the IEEE p1284 protocol and are known to the skilled artisan.

The byte stream which is transferred bi-directionally on the parallel printer interface 42, 43, 44 is structured into AHI messages having the format described above. An AHI IOCB message is illustrated, for example, in FIG. 4, where it is denoted by reference numeral 66. Assume that this AHI message 66 is being received through the parallel printer interface 42, 43, 44. The message is passed, byte-by-byte, to a terminal AHI task, ahi_pip_isr 83. Once the ahi_pip_isr 83 determines that the incoming AH message 66 is an IOCB (as denoted in the Type field), it receives the incoming AHI IOCB message in two pieces: the AHI Header and IOCB Header field, and the message data, comprising the IOCB and any accompanying IOCB data. The ahi_pip_isr 83 places the AHI and IOCB headers into a local buffer 85 which is passed to a hst_req_task 84 in the HPSX component of the terminal control tasks 29, 36. The AHI message data is placed into the VDPRAM 52, the ahi_pip_isr 83 determining the "proper place in VDPRAM 52" from the IOCB PTR field in the IOCB header. Once the IOCB PTR, the IOCB and associated data have been copied to the VDPRAM, the ahi_pip_isr 83 posts the local buffer 85 to the hst_req_task 84. The interface between the task 83 and 84 is a queued interface, as opposed to a mailbox interface, which allows the terminal AHI 51 to continue receiving AHI messages. Upon receiving the first byte of the AHI IOCB message, the ahi_pip_isr 83 sets a host flag in the register section of the VDPRAM 52. When set, the Host Flag indicates that the parallel printer interface 42, 43, 44 is providing a message to the terminal adapter 40. Since the interface is half duplex, setting the Host Flag coordinates reception and transmission of messages over the parallel printer interface. In this respect, when the Host Flag is set, the terminal adapter 40 is unable to transmit data to the host computer. After posting the AHI message 66 to the hst_req_task 84, the ahi_pip_isr 83 clears the Host Flag.

The hst_req_task 84 in the HPSX section of the terminal control tasks 29, 36 utilizes the information in the IOCB header portion of the buffer 85 and transforms it into the above-described full IOCB format in the VDPRAM 52. Using the IOCB PTR field of the IOCB Header, the hst_req_task 84 calculates the address of the IOCB in the VDPRAM 52. It then calculates the appropriate Length field value for the IOCB in the VDPRAM 52 using the Length field of the IOCB_Header. All other IOCB fields are initialized and any accompanying IOCB data is properly located in the VDPRAM 52 by the hst_req_task 84. The task 84 then processes the IOCB as if it were a bus-based DPRAM IOCB. This processing is explained essentially in the incorporated '609 patent.

An IOCB complete message is sent to the host computer in the form of the data structure indicted by reference numeral 93 in FIG. 7. To send an IOCB complete message, a task, such as the task 91, contained in the TCS 36, that controls a peripheral device as described in the '609 patent, makes a call to a done () function 90 in the terminal AHI 51. The terminal AHI done () function 90 operates essentially as described above to generate an AHI complete message such as the AHI message 93 shown in FIG. 7. In this regard, each AHI complete message includes a header with two fields (Type and Length), that identify the message type and the number of bytes in the message, respectively. In addition, AHI IOCB complete messages include an IOCB PTR field copied from the corresponding field in the VDPRAM 52 for the purposes discussed above. The complete message is placed in the buffer and the buffer is passed to an ahi write task 95. The ahi write task 95 serializes the transmission of AHI complete messages through the parallel printer interface in response to the Host Flag. The ahi_write task 95 has a queued interface with the done () task 90. When it receives a message on its main input queue, the ahi_write task 95 checks the Host Flag. If set, the parallel printer interface is busy and the task waits; if reset, the parallel printer interface is idle and is able to transmit data to the host computer. Once the ahi_write task 95 obtains control of the parallel printer interface through the do_p1284 task 80, data transmission is initiated, completed, and the parallel port interface 46 makes the proper state transmission to the Reverse Idle state illustrated in FIG. 5.

AHI PROTOCOL

The protocol implemented by the communication system described above and illustrated in FIGS. 3–7 maintains the use of IOCB interface for logical communication between the driver interface 26 and the terminal control tasks 29, 36. This interface uses VDPRAM data structures and interrupts to provide the communication between the host computer and the terminal adapter. Since the VDPRAM 52 is not directly accessible by the host computer and no direct hardware interrupt mechanism to the terminal adapter is employed, the IOCB and interrupt functionality are packetized by the AHI protocol.

The protocol and the implementing messages treat the peripheral devices, their respective ports, and the specialized processes which control them as "channels". Thus, in the discussion which follows, the term "channel" is used interchangeably with "peripheral device".

The structure for the AHI protocol employs two formats: a host-to peripheral message format and a peripheral-to-host message format. The protocol recognizes at least an IOCB complete interrupt from peripheral to host.

Figure 8:
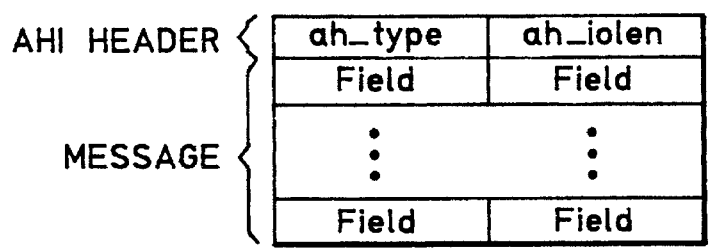
FIG. 8 illustrates a message format used in a protocol that implements a method of the invention.

The message definitions are based on the DPRAM and IOCB fields outlined in the discussion relating to FIGS. 3–7. Relatedly, all AHI messages have a common header, the AHI header. FIG. 8 is a graphical illustration of the data structure of an AHI message. The fields of the AHI header are defined as:

ah_type: This field describes what type of AHI message follows. From the host computer to the terminal adapter, this field defines a plurality of message types, one of which is denoted as an IOCB message. The IOCB message is used to send IOCBs and related data for processing in the terminal adapter. For messages from the terminal adapter to the host computer, this field provides the Host Code functionality described above, for which at least an IOCB_DONE message type is defined, denoting that an IOCB has been processed to completion. Among other message types, this field defines a DAV message denoting data is available on an asynchronous channel and a DRQ message denoting that the terminal adapter is ready for more data on an asynchronous channel. Terminal adapter ahi tasks also generate an AHI nonIOCB complete message as described in more detail below.

ah_iolen: This filed specifies the total length of the message comprising the length of the header plus the number of bytes remaining in the message.

The message formats for host computer-to-terminal adapter communications employ IOCBs to communicate with the terminal adapter. The AHI protocol only supports the existence of IOCBs and data within the VDPRAMs, since the terminal adapter has no direct access to host computer memory. Thus, all references to IOCBs and related data are through the offsets from the base of VDPRAM "data" area. The terminal adapter and the host computer each maintain a "virtual" DPRAM, the base of which is used as the base for the offsets in the IOCB PTR and DATA fields. Each host-to-terminal AHI message, therefore, includes an IOCB header as follows:

```
typedef struct           /* AHI IOCB header                          */
ahi_iocb_hdr
{
    bit16  length;       /*"extension" length                        */
    bit16  mhj_dev;      /* Destination routing                      */
    bit16  min_dev;      /* Application-specific use                 */
    bit16  data_len;     /* Length of data following this header     */
    bit16  iocb_ptr;     /* IOCB offset in VDPRAM                    */
    bit16  data;         /* data offset in VDPRAM                    */
}
```

The significance and use of the iocb_ptr and data fields have been discussed above. The length field contains the size of an associated AHI message extension.

All of the IOCB-specific information contained in VDPRAM registers pertinent to an AHI message is contained in the ahi_iocb_hdr and the message-specific extension fields. The standard extension (ahi_ext) is:

```
typedef struct ahi_std_ext       /* AHI Standard IOCB Extension              */
{
    bit16  command;              /* OPEN, CLOSE, READ, WRITE, IOCTL          */
    bit16  cmd_modifier;         /* Further refines command                  */
    bit32  cmd_param;            /* Optional parameter for some commands     */
}
```

The standard extension is used to transfer IOCBs containing channel commands. The commands illustrated above are operating system-specific, as will be understood by those skilled in the art. These commands are not intended to limit the kinds of commands that can be sent according to the protocol of the invention.

The AHI protocol also implements a multi-channel READ IOCB that utilizes a standard IOCB extension which, however, contains read_bits as data. The read_bits are sent to the terminal adapter as data in order to "packetize" VDPRAM fields.

In the multi-channel read IOCB, the data portion of the AHI extension essentially comprises an array of bytes, wherein each bit of each byte designates a respective channel signifying a read request status for the designated channel in a particular multi-channel read operation.

The terminal adapter can pass two types of messages to the host computer. The IOCB complete message signifies completion of an IOCB request. In addition, AHI protocol supports an asynchronous message that can be sent to the host computer completely independent of an IOCB. The IOCB complete messages have a standard format and a multi-channel write complete format.

The standard format message structure is given as:

```
typedef struct ap2h_ic_hdr         /* AHI Adapter to Host - IOCB Completion
{
    AHI_HDR   hdr;                 /* AHI protocol header
    bit32     iocb_ptr;            /* Copied from IOCB iocb_ptr field
    bit32     iocb_status;         /* Status of this IOCB completion
                                   /* Low word = length
                                   /* High word = status
}AP2H_MCWRITE_IC_HDR;
```

This message structure is a non-write IOCB completion message. The ahi_hdr has been described above. In the IOCB complete message, the iocb_ptr field serves to identify a completed IOCB, which corresponds to the IOCB with an original IOCB request sent by the host computer. This field is a copy of the VDPRAM offset supplied in the iocb_ptr field of the original IOCB request from the host computer. Based on this value, the host computer knows exactly which IOCB in the VDPRAM is being completed.

The iocb_status field provides a mail function intended to convey information regarding completion status of an IOCB.

A multi-channel write complete message format sent by the terminal adapter to the host computer is given as:

```
typedef struct ap2h_mcwrite_ic_hdr      /* AHI Adapter to Host - Multi-Write      */
{
        AHI_HDR         hdr;            /* AHI protocol header                    */
        bit32           iocb_ptr;       /* Copied from IOCB iocb_ptr field        */
        bit32           iocb_status;    /* Status of this IOCB completion         */
                                        /* Low word = length                      */
                                        /* High word = status                     */
        bit8            dreq[5];        /* Data request bits                      */
} AP2H_MCWRITE_IC_HDR;
```

The format of the message is similar to the standard IOCB complete, with the exception of an addition of a dreq bit field array. This field is used to relay to the host computer what channels are able to accept more data from the host computer. The dreq field is a multi-byte array containing status information about each of the ports on the terminal adapter. The bits in each of these bytes are used to control the flow of data to channels in order to avoid buffer overflow and underflow. These bits are associated with terminal adapter ports in the same manner as read_bits in the host computer-to-terminal adapter multi-channel read message discussed previously. If a bit is off (zero) for a particular port, the peripheral device attached to this port is not able to accept more data from the host computer.

The terminal adapter also uses a non-IOCB complete message to communicate channel information which is unrelated to the completion of an IOCB. This packet is defined as:

cates a channel cannot accept any more data, at some later time, when that channel can accept more data, an asynchronous Data Request "interrupt" packet is sent indicating that the channel can now accept data.

In the best mode and preferred embodiment of the invention, AHI message exchange between the host computer and terminal adapter comprises the following operations: open, close, multi-channel write, multichannel read, IOCTL. These operations implement host computer calls to device drivers for communication with channels. The inventors contemplate that single-channel write and read operations can be implemented using the structure and protocol of the invention.

To open a channel, the host computer formats an OPEN AHI message, and sends it to the terminal adapter. The terminal adapter responds to the OPEN message by returning an IOCB complete message which contains the status of the opened channel. In addition to the IOCB complete

```
typedef struct ap2h_int_hdr             /* AHI Peripheral to Host - Interrupt msg */
{
        AHI_HDR         hdr;            /* AHI protocol header                    */
        bit32           int_chaininfo;  /* General channel information            */
} AP2H_INT_HDR;
```

The int_chaninfo field is used to provide information in asynchronous messages sent to the host computer.

The read_bits and the reqbits provide flow control for data being read from, or written to, channels. The host computer indicates which channels it wishes to read from by passing to the terminal adapter a multichannel read message. Each bit in the read_bits array is associated with a peripheral device on the terminal adapter. The read_bits are associated on a channel basis from least significant to most significant bit. Each set bit in this array indicates which peripheral device is being read from in a particular multi-channel read.

Figure 9:
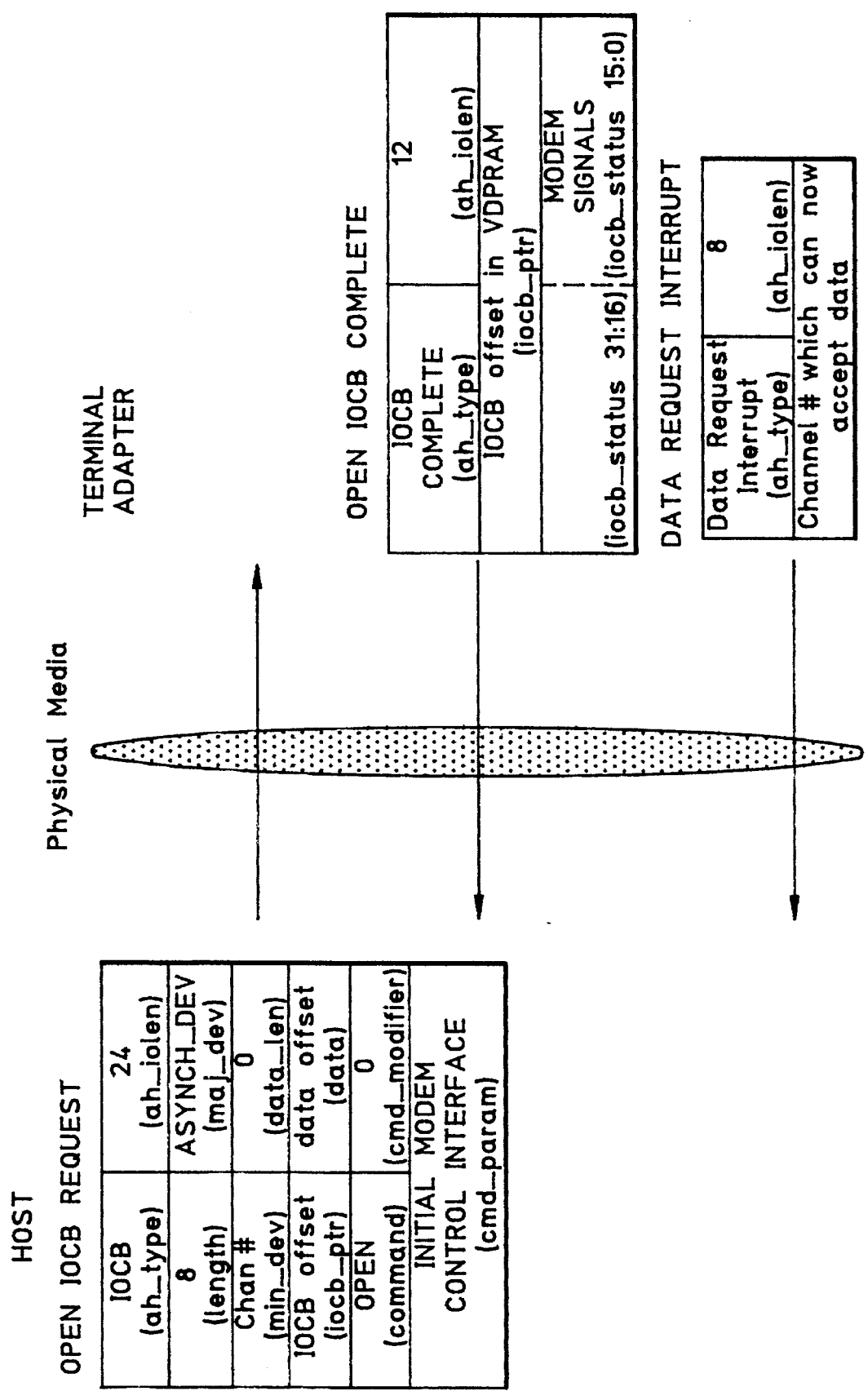
FIGS. 9–13 are message flow diagrams illustrating certain specific protocols of the method of the invention.

The states of the dreq bits are reported to the host computer in two ways. First, the terminal adapter may employ a multi-channel write IOCB completion message and an asynchronous non-IOCB complete message termed a Data Request "interrupt" message. When the host computer opens a channel, the terminal adapter returns an asynchronous Data Request "interrupt" message indicating that the requested peripheral device can accept data. Likewise, when the host computer closes a channel, that channel will not be able to accept any more data. The transition of the dreq bit for a closed channel is implicit in the close and is never reported by the terminal adapter. Since the dreq for a particular channel only transitions from "on" to "off" when the host computer is writing data to that channel, the terminal adapter uses the multi-channel write IOCB completion message (in particular, the dreq field) to notify the host computer of what channels are able or unable to accept data. If the multichannel write IOCB completion message indimessage, the terminal adapter sends to the host computer an asynchronous Data Request interrupt message indicating that the channel just opened can accept data. FIG. 9 illustrates the AHI message exchange which implements an open request from the host computer. Initially, an open IOCB request message is assembled in the host computer, sent over the physical interface to the terminal adapter. In the terminal adapter, the open IOCB complete and Data Request interrupt messages are assembled and sent back to the host computer.

Figure 10:
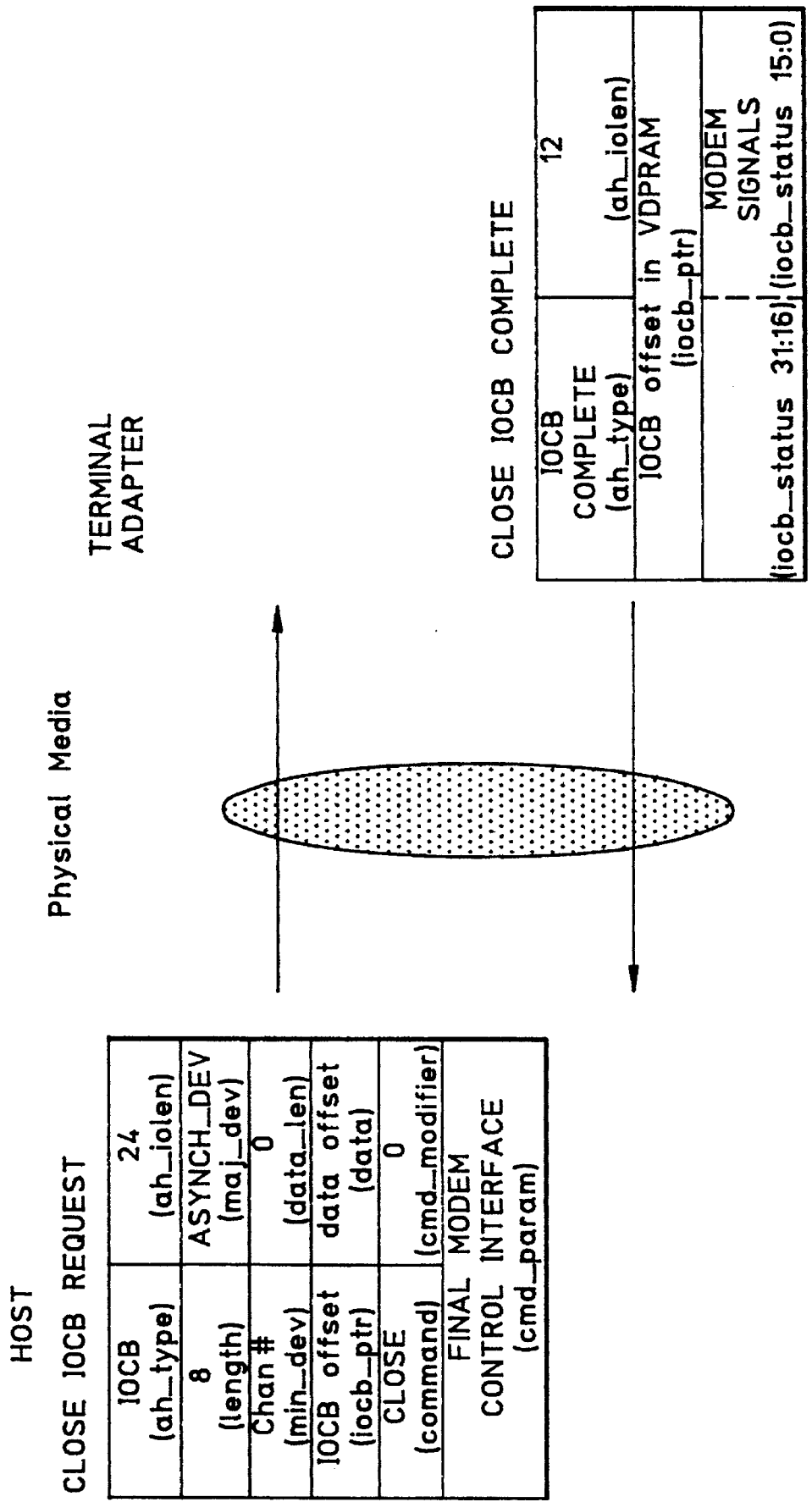

FIG. 10 illustrates the AHI message exchange implementing a request from the host computer to close a channel. In this case, a close IOCB request message is assembled in the host computer and sent over the physical interface to the terminal adapter. In the terminal adapter, a close IOCB complete message is assembled and sent back to the host computer.

Figure 11:
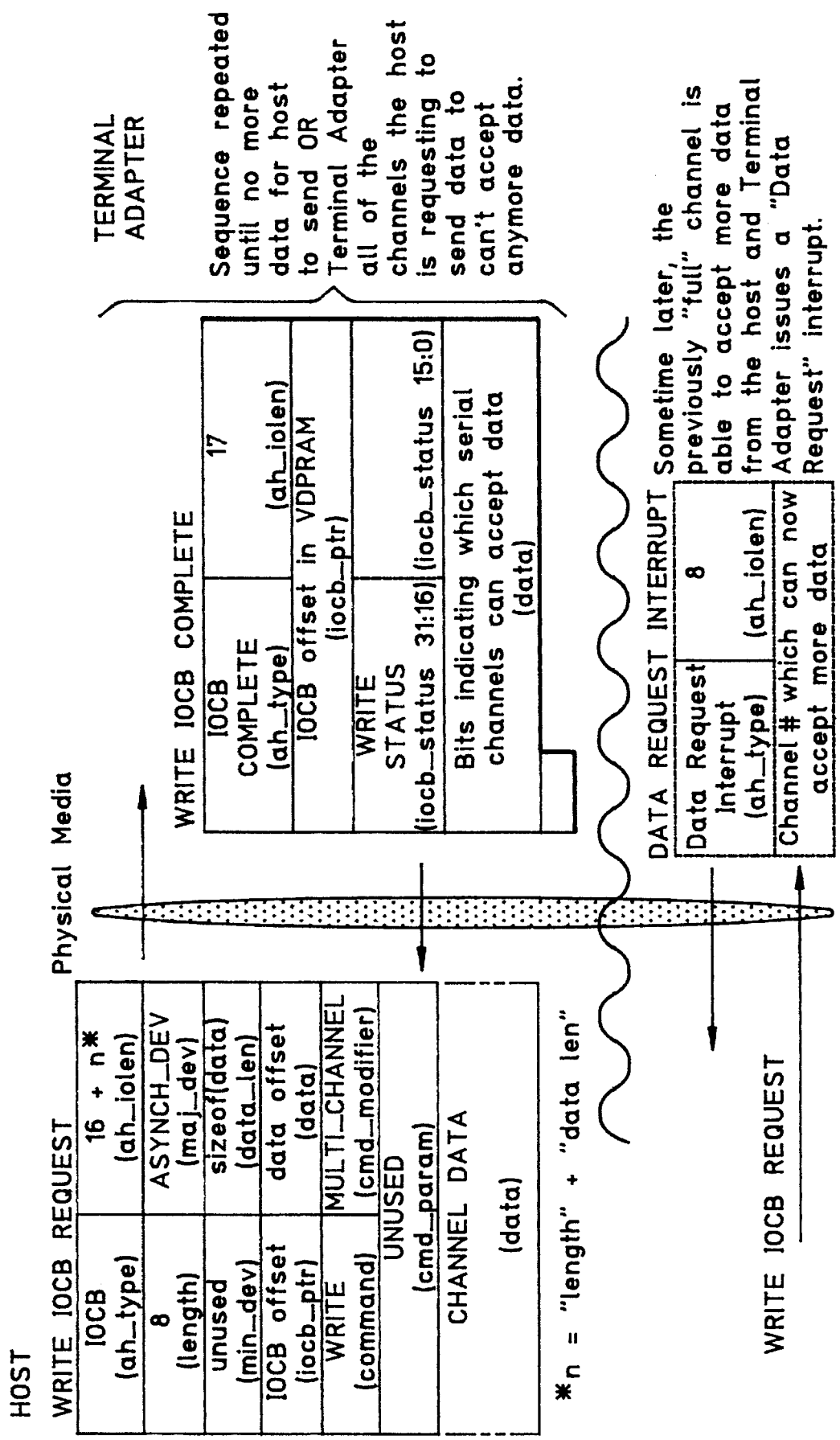

A multi-channel write operation is illustrated in FIG. 11. As Figure 11 shows, the host computer formats a multi-channel write AHI message and transmit it across the physical interface to the terminal adapter. The terminal adapter executes the multi-channel write operation, parceling out to the channels data contained in the channel data field of the message. Upon completion, the terminal adapter returns an IOCB multi-channel write completion message containing a bit field indicating which channels can still accept data as well as which channels cannot. Normally, channels which cannot accept data are those whose buffers are full. When one of the channels marked "full" later becomes able to accept more data, the terminal adapter sends a Data Request interrupt message following which the host computer will send more data, if any, to the channel in a subsequent write IOCB request packet.

Figure 12:
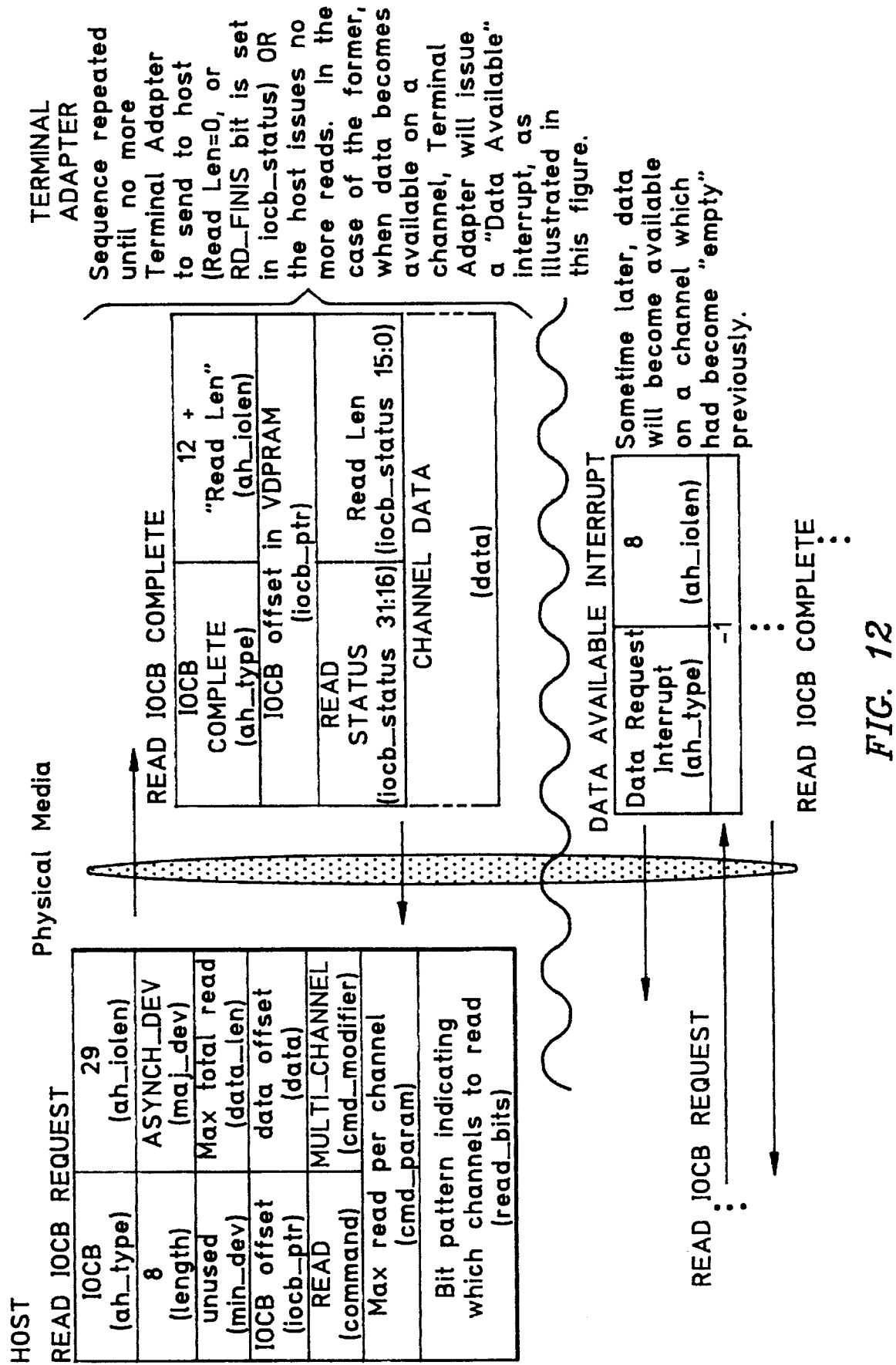

A multi-channel read operation is illustrated in FIG. 12. In Figure 12, a read IOCB Request message is assembled in the host computer and sent across the physical interface to the terminal adapter. For each read_bit set in the message, the terminal adapter obtains data from the identified channel and sends it back across the physical interface by a Read IOCB Complete message. The request/complete sequence is repeated until there is no more data to transport from a channel to the host computer, or until the host computer issues no more requests. In the case of the former, when data becomes available from a channel, the terminal adapter will issue a Data Available interrupt message, following which the host computer will issue a multi-channel Read Request with a read_bit set for the peripheral device.

Figure 13:
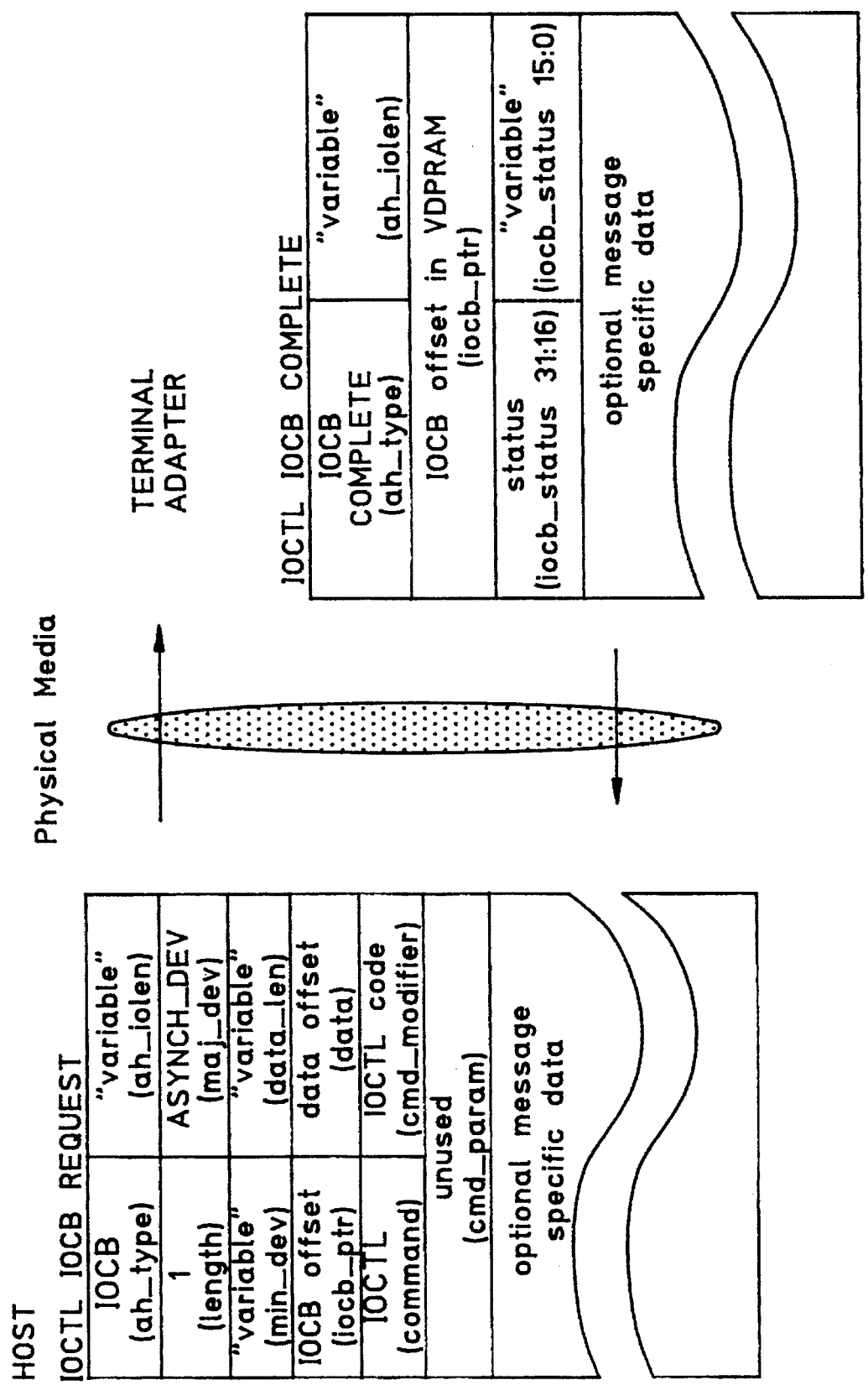

The IOCTL IOCB Request message is used to allow host computer tasks to issue device-specific commands. An AHI IOCTL exchange is illustrated in FIG. 13. In this case, a request message is assembled in the host computer for a particular device (specified in the min_dev field) and sent across the physical interface to the terminal adapter. The terminal control tasks 29 and 36 implement the command, sending back an IOCTL IOCB Complete message to report command completion and device status.

While only certain preferred features of this invention have been shown by way of illustration, many changes and modifications will occur to those skilled in the art. Accordingly, it is to be understood that the appended claims are intended to cover all such modifications and changes as fall within the true spirit and scope of the invention.

We claim:

1. A communication system for coupling a host computer with a plurality of peripheral devices, comprising:

a host interface in the host computer for receiving peripheral device control information and data from a plurality of peripheral device drivers;

a host interface memory means for buffering peripheral device control information and data between the host interface and the plurality of peripheral device drivers;

a host parallel port in the host computer;

a host port interface in the host computer coupled to the host interface, to the host interface memory means, and to the host parallel port for providing two-way communication of control information and data between the host interface memory means and the host parallel port;

a signal conductor connected to the host parallel port; and a terminal adapter, remotely located from the host computer, the terminal adapter including:

a terminal adapter parallel port connector connected to the signal conductor;

a terminal adapter interface memory means for buffering the control information and data;

a terminal adapter port interface connected to the terminal adapter parallel port connector for communication of the control information and data between the terminal adapter and the terminal adapter parallel port;

a terminal adapter interface coupled to the terminal adapter port interface and to the terminal adapter interface memory means for entering control information and data in the terminal adapter interface memory means; and a terminal control means coupled to the terminal adapter interface and to the terminal adapter interface memory means for controlling the operation of a plurality of peripheral devices in response to control and status information in the terminal adapter interface memory means.

2. The communication system of claim 1, further including a plurality of serial ports on the terminal adapter, each serial port for connection to a respective peripheral device, the terminal control means being coupled to the plurality of serial ports for controlling the operations of peripheral devices attached to the serial ports.

3. The communication system of claim 2 further including at least one device parallel port on the terminal adapter, the terminal control device interface means further being coupled to the device parallel port for controlling the operation of a peripheral device connected thereto.

4. The communication system of claim 1, wherein the host computer parallel port is for conducting communications with a remote parallel port by a predetermined communications protocol.

5. The communication system of claim 1, wherein the host computer parallel port is a parallel printer port.

6. The communication system of claim 5, wherein the parallel printer port is for conducting communication with a remote parallel printer port by a predetermined communications protocol.

7. The communication system of claim 4 or claim 6, wherein the predetermined communications protocol is for half-duplex communication.

* * * * *